United States Patent [19]

Rinaldi

[11] Patent Number: 5,171,954
[45] Date of Patent: Dec. 15, 1992

[54] METHOD AND DEVICE FOR WELDING PIPES AND A PIPE-LAYER

[75] Inventor: Fernando Rinaldi, Guardamiglio, Italy

[73] Assignee: Atlantic Point Incorporated, Panama

[21] Appl. No.: 639,901

[22] Filed: Jan. 10, 1991

[30] Foreign Application Priority Data

Nov. 2, 1990 [NL] Netherlands ............... 9002396

[51] Int. Cl.⁵ .............................................. B23K 9/12
[52] U.S. Cl. ................................. 219/61; 219/125.11
[58] Field of Search ............... 219/60 R, 61, 125.11, 219/125.1, 124.34

[56] References Cited

U.S. PATENT DOCUMENTS

| | | | |
|---|---|---|---|
| 3,555,239 | 1/1971 | Kerth | 219/125.1 |
| 4,144,992 | 3/1979 | Omae et al. | 219/125.11 |
| 4,145,593 | 3/1979 | Merrick et al. | 219/125.11 |
| 4,283,617 | 8/1981 | Merrick et al. | 219/125.1 |
| 4,559,430 | 12/1985 | Hayakawa | 219/125.11 |
| 4,645,902 | 2/1987 | Hawakawa | 219/125.11 |
| 4,883,938 | 11/1989 | Sarugaku | 219/125.1 |

FOREIGN PATENT DOCUMENTS 2412380 7/1979 France.

Primary Examiner—Clifford C. Shaw
Attorney, Agent, or Firm—Ostrolenk, Faber, Gerb & Soffen

[57] ABSTRACT

In a method for welding together pipe ends of pipes held mutually in line the welding process is automatically controlled subject to the angular distance traversed by the welding lance.

8 Claims, 4 Drawing Sheets

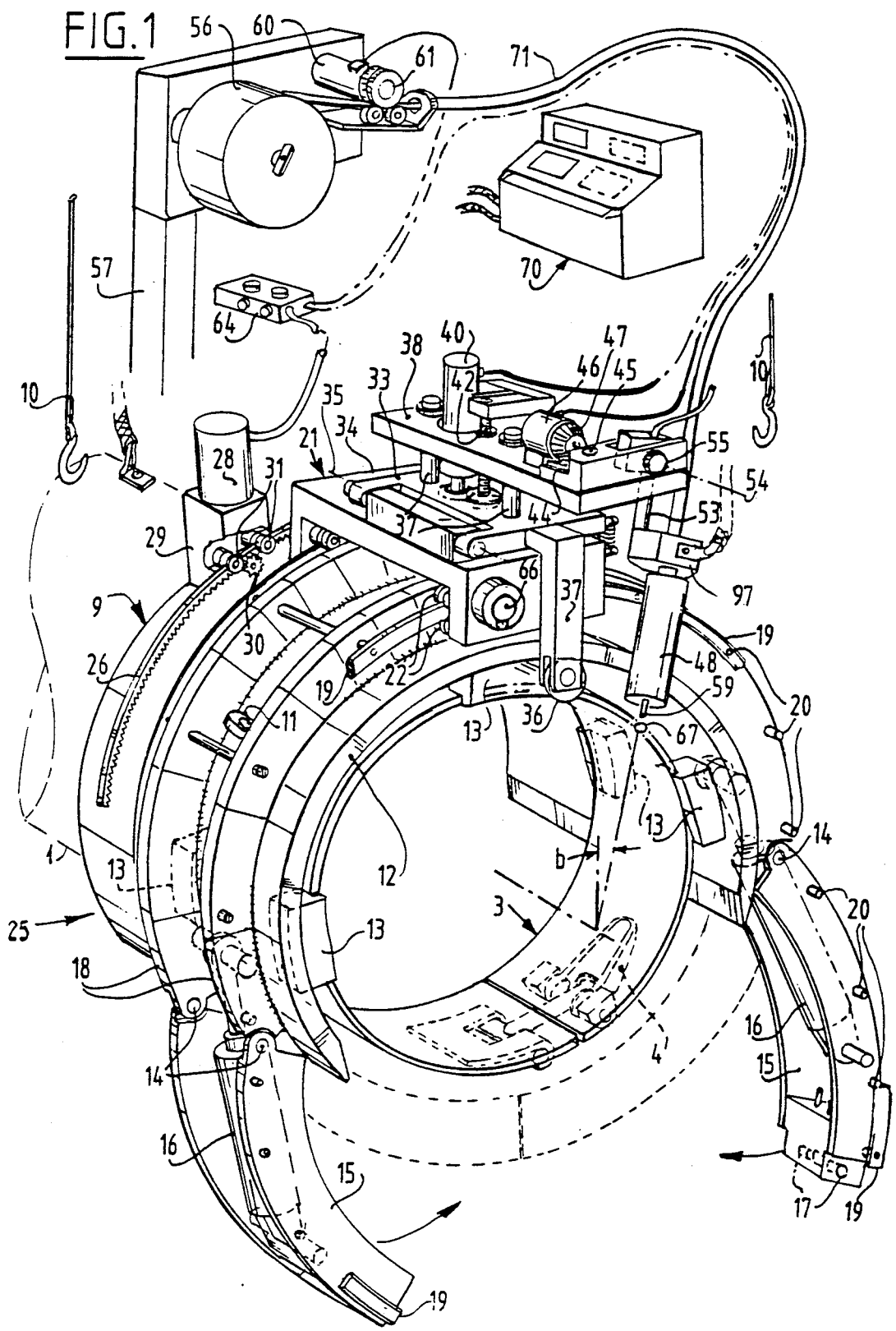

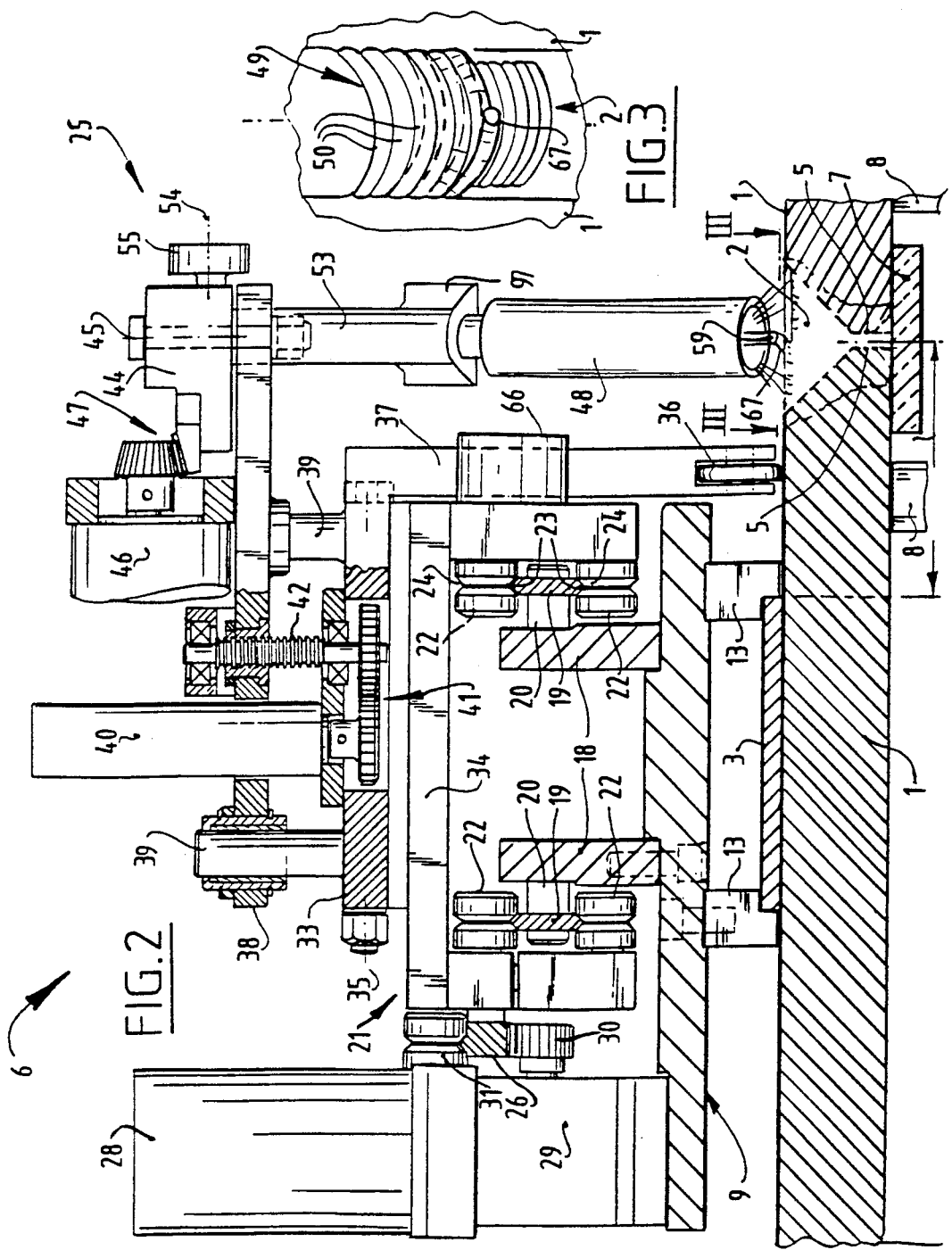

METHOD AND DEVICE FOR WELDING PIPES AND A PIPE-LAYER

BACKGROUND OF THE INVENTION

The invention relates to a method for welding together pipe ends of pipes held in line with each other. The welder must herein adapt the welding process to diverse, changing conditions and he selects a welding speed such that he can just still manage to perform the various adjustments. Needing adjustment for instance are the welding voltage, the welding wire feed, the speed of the welding lance in peripheral direction of the weld, the speed of the zigzag movement of the welding lance, the distance of the welding lance to the bottom of the weld and the gas feed to the welding lance.

SUMMARY OF THE INVENTION

The invention has for its object to improve the welding process, i.e. to improve the weld quality and/or increase the welding speed. According to the invention the welding process is automatically controlled for this purpose.

Practically, the welding process is automatically controlled subject to the angular distance between the welding point and a reference point on the weld periphery. The welding process changes mainly with the slope of the welding melt. Once the ideal setting of all parameters has been determined for the diverse angular distances, the settings associated with each momentary angular distance can be easily and rapidly controlled by a computer. In this manner a good weld quality can be combined with a high welding speed.

The invention also relates to and provides a device for performing the invented method.

The invention also relates to and provides a pipe-layer on which the invention can be used to particularly great advantage. Since the angle of pitch of a pipe-layer affects the welding process, the pipe-layer according to the invention is preferably characterized by a pitch measuring device for measuring the angle of pitch of the vessel, which device generates signals to the control means for the welding process.

A still greater advantage is achieved with use of the method according to the invention at a number of successive welding stations of a pipe-layer.

BRIEF DESCRIPTION OF THE DRAWINGS

The mentioned and other features according to the invention will be elucidated in the description following hereinbelow with reference to the drawings. In the drawing in schematic form:

FIGS. 1 and 4 show a perspective view of two different devices according to the invention;

FIG. 2 shows on a larger scale a lengthwise section along the line II—II of FIG. 1;

FIG. 3 shows a view along arrows III of FIG. 2;

FIG. 6 is a graph diagram of an example for the control of the welding process with a device of FIGS. 1 and 2.

DETAILED DESCRIPTION

Figure 4:
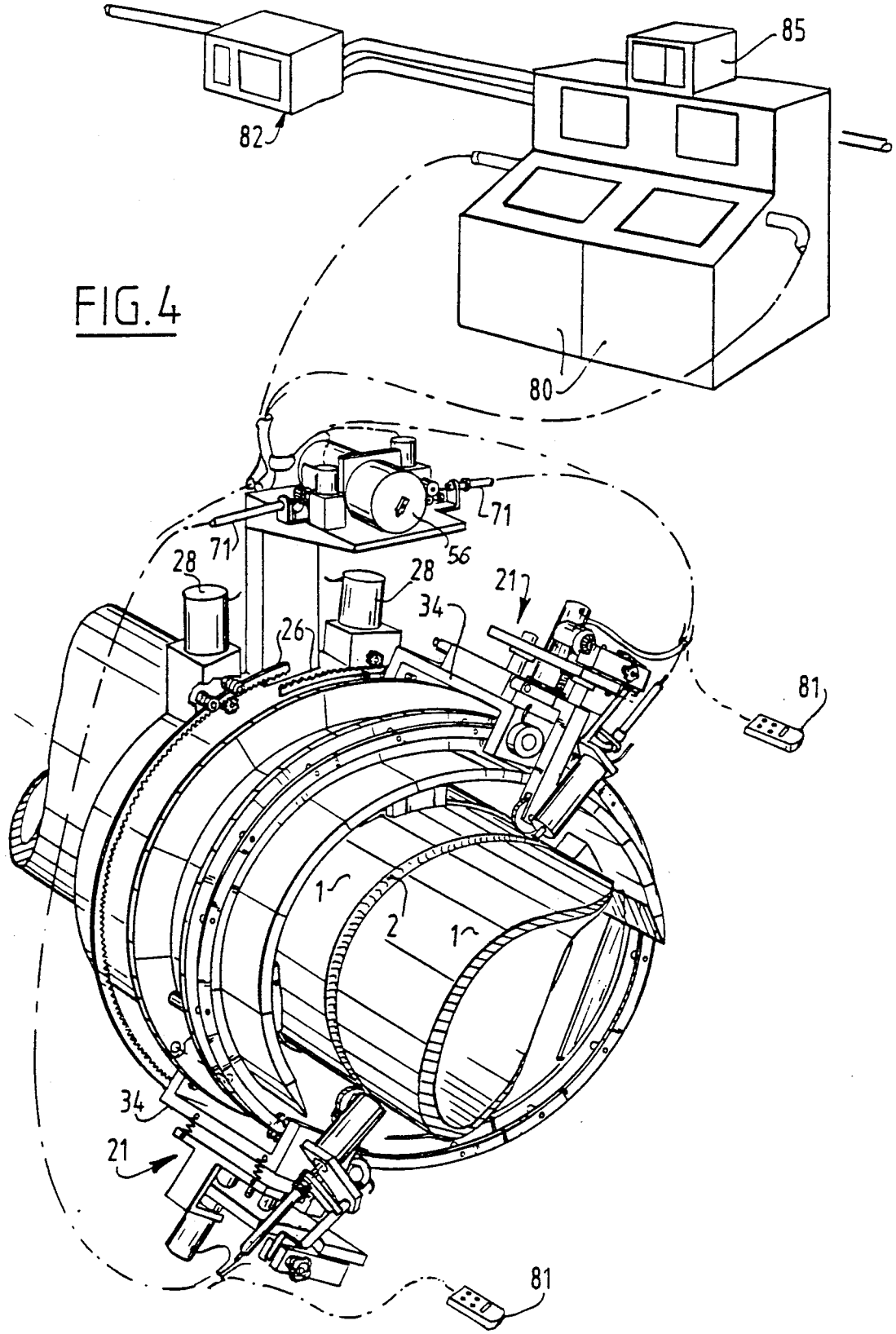

The present invention is particularly of use on a pipe-layer in the form of a vessel, wherein a series of pipes are held mutually in line and are welded to each other to form a pipe string which sinks to the surface located under water. Welding work is herein carried out simultaneously at a number of welding stations.

FIGS. 1 and 2 show only one welding station 6, where a ring weld 2 is applied between two pipes 1 held in mutual alignment. For this purpose one pipe 1 is supplied at a time to a welding station 6 which carries a fixing band 3 preferably placed therearound in advance. This is a thin, elastic, metal, annular band which is cut through on the bottom and provided there with a band closure 4 with which the fixing band 3 can be clamped round a pipe 1 with considerable tension. During fitting of the fixing band, care is taken that this has a predetermined distance q to the pipe end face 5.

At the location of the welding station 6 a support ring 7 and pipe alignment means 8 are arranged inside the pipes at the position of the ring weld to be arranged and are supported on a core (not drawn) held in the pipes 1.

Further placed on the fixing band 3 at the position of the welding station 6 is a ring frame 9 which is manipulated to this end by hoisting means 10 which grip onto hooks 11 of ring frame 9. The ring frame 9 comprises an upper ring piece 12 which grips with support blocks 13 onto both edges of fixing band 3 in addition to two lower ring pieces 15 which are pivotally attached to the piece 12 on shafts 14 and which can be opened and closed by means of pneumatic cylinders 16 and in closed position can be firmly coupled to one another by means of closing means 17. The closed ring frame 9 has radial flanges 18 to which continuous rails 19 are fixed over the whole periphery by means of axial pins 20. A chassis 34 of a welding carriage 21 is guided over both rails 19 by means of guide rollers 22 which grip with V-shaped grooves 24 onto the wedge-shaped inner and outer edges 23 of rails 19.

Fixed to the chassis 34 of the welding carriage 21 is a gear rim 26, while fixedly attached to the ring frame 9 is an electric stepping motor 28 with reduction drive gear 29 which drives the gear rim 26 and therewith the welding carriage 21 via a tooth wheel 30. The gear rim 26 is held between the tooth wheel 30 and two guide rollers 31. The mass of the welding carriage 21 is reduced because the motor 28 with the drive gear 29 thereof is supported by the fixed ring frame 9. A support frame 33 is connected pivotally about a longitudinal axis 35 to the chassis 34 and is thus adjustable and is controlled subject to a pick-up 36 which picks up the pipe shape and consists of a support roller bearing on the outer periphery of pipe 1 and connected to support frame 33 by means of a support 37. A lance carrying frame 38 is guided for adjustment in the radial direction relative to the support frame 33 by means of pins 39 and is adjusted by means of an electric stepping motor 40 via a gear transmission 41 (FIG. 2) and a screw spindle 42.

A lance carrier 44 is connected to the lance carrying frame 38 for swivelling about the radial axis of pivot 45 and is driven in oscillating manner by an electric stepping motor 46 via a bevel drive gear 47, this such that the welding lance 48 carried by the lance carrier 44 covers the zigzag path 49 with curved zigzag lines 50 shown in FIG. 3. A better weld is hereby achieved. A slide frame is optionally built in between the lance carrying frame 38 and the lance, carrier 44 in order to displace the swivel axis 45 in the axial direction of ring frame 9 in case a pipe end face 5 is cut at a slant.

The welding lance 48 is fixed to the lance carrier 44 by means of a lance holder 53 which can be swivelled into a cleaning position about a longitudinal axis 54 and which can be fixed into a selected, more or less oblique welding lance position by means of a hand control 55. Further, using means that are not drawn, the welding lance 48 is manually adjustable in a holding block 97 in order to orient the welding lance 48 into its starting position.

In order to reduce the mass of the welding carriage 21, a welding wire carrier 57 is fixed to the ring frame 9 and carries a supply roll 56 of welding wire 59 and an electric stepping motor 60 for driving the welding wire 59 by means of a drive roller 61. In the case of thin welding wires, three rollers (not drawn) are disposed such that they together straighten the welding wire 59.

The welding wire 59 is guided to the welding lance via an elastic, flexible conduit 71 arranged fitting closely around the wire.

Further present are remote control means 64 for controlling the diverse mentioned motors.

An angle measuring device 66 is arranged on the welding carriage 21 for measuring the angular distance b between the welding point 67 of the welding lance 48 on the weld periphery and a reference point 68.

The angle measuring device 66 is preferably situated in the lengthwise plane through the welding point 67 drawn in FIG. 2.

The motors 28, 58, 40 and/or 46 and optionally also a gas control (not drawn) for feeding gas to the welding lance are automatically controlled subject to the measured momentary angular distance b by means of a computer 70.

This method for controlling the welding process has the advantage that welding takes place automatically in a continually changing manner which takes into account the slope of the weld at the position of the welding point 67. This saves the welder a great deal of work and concentration so that he has only a supervisory function. The welding speed can hereby be increased to the welding speed permissible for each welding point 67, this in contrast to the known method wherein a speed permissible for all welding points 67 is set. The mentioned stepping motors can—although not in preference—consist of hydraulic or electromagnetic motors or electric DC or AC motors which are provided with a suitable control with feedback signal.

The welding device 25 of FIG. 4 corresponds with those of FIGS. 1 and 2, with the difference that two welding carriages 21 are now present each having connected to their chassis 34 a gear rim 26 which are each gripped by their own motor 28. There are of course two motors 58 likewise present for the welding wire feed.

It is noted that the ring frame 9 and the welding carriage(s) 21 associated therewith can be used for all kinds of pipe diameters if an adapted fixing band 3 is employed with adapted support blocks 13 which are releasably attached to the upper ring piece 12.

The invention can be used for pipes of diverse steel types and with dimensions varying from 4 to 20" with wall thickness from 6 to 30 mm.

Six welding stations 6 are for instance present, each equipped with two main control units 80 and each provided with a remote control element 81 so that a welder, while observing the welding process, can intervene at a random place and position with such an element 81.

Figure 5:
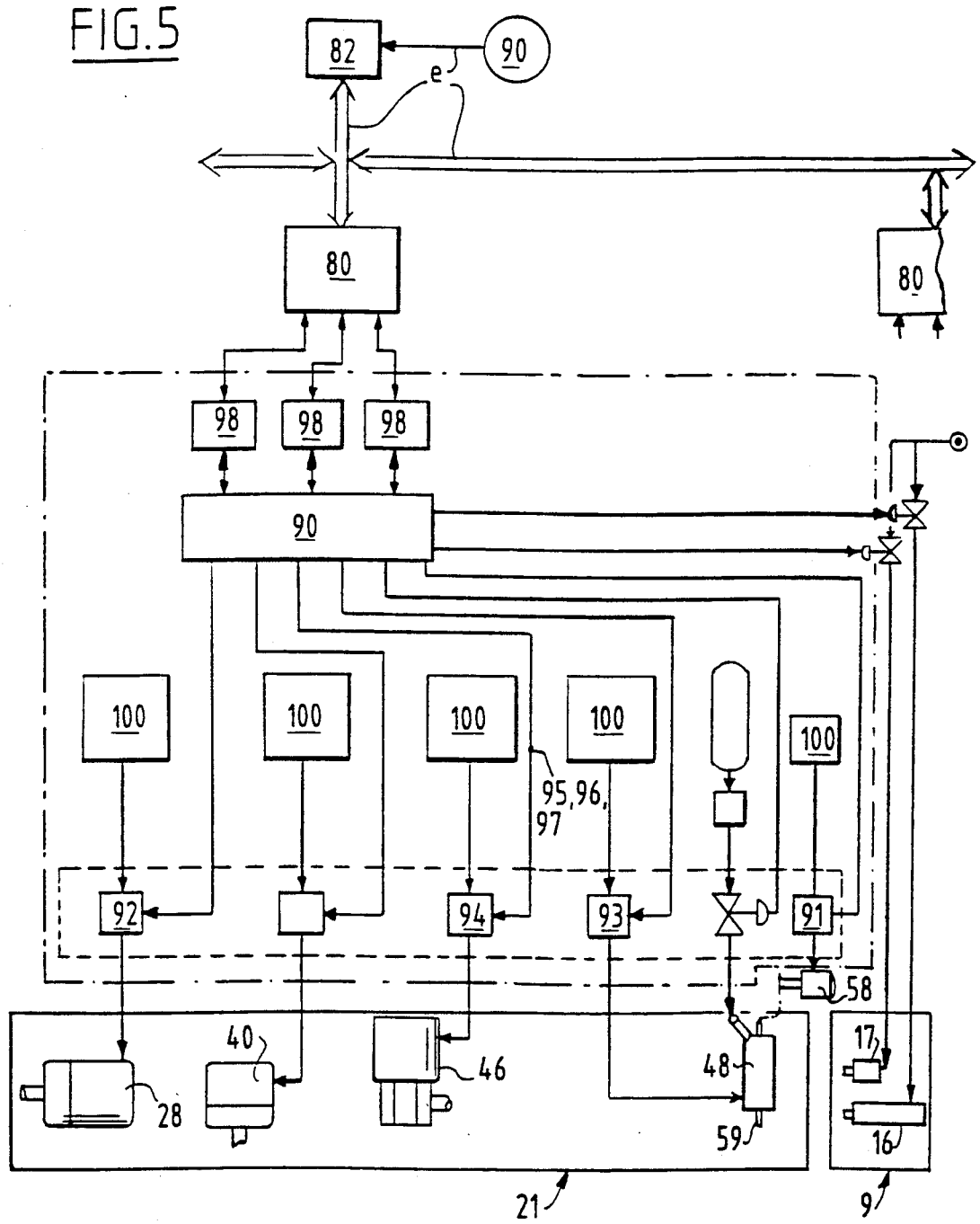
FIG. 5 shows a circuit diagram of the device of FIGS. 1 and 2.

With reference to FIG. 5, the main control units 80 of a plurality of welding stations 6 are all connected to a common central computer 82. There are optionally two central computers present, each for three welding stations 6, which are then provided with identical welding programs. The welding program comprises a control of the welding process for six parameters each of which are adjusted to an ideal setting subject to the angular distance a. This setting can take place step-wise, for instance per 15° of angular distance a, this differing if necessary for the various welding beads of a weld lying one above another. For the welding bead to be carried out, the associated series of functions is therefore selected, each of which as noted is dependent on the angular distance a. The six controlled parameters are:

welding wire feed—W.S =f(a) with switch 91 of motor 58;

lance speed—W.W.=f(a) with switch 92 of motor 28;

lance voltage—W.V.=f(a) with switch 93;

oscillation speed—O.S.=f(a) signal 95 to switch 94 of motor 46;

oscillation width—O.A.=f(a) signal 96 to switch 94;

oscillation rest time—O.D.=f(a) signal 97 to switch 94.

The cassette with a programmed welding process for a determined pipe dimension and material is entered in the common computer 82 and the memory of the computer 82 is loaded. The computers 80 are now connected to computer 82 so that the welding parameters are entered into the memories of computer 82 as a function of the angular distance a. Each of the welding lances 48 welds a sector of 180°, to the left and right, wherein a mutual collision is prevented by position measuring of the welding lances 48. It is possible for one welding lance 48 to wholly or partially take over the welding work in the region of the other if this other fails. With small pipe diameters there is only one welding lance 48 present per welding station which finishes the whole periphery (FIG. 1).

If a change has to be made in the welding program, this is then carried out simultaneously for all welding stations 6 in the central computer 82. The parameter functions may, however, only be modified to a small extent in order to prevent the standard weld quality falling outside that agreed with the customer for the pipe string. It is therefore recommended to leave the cassette in the central computer 82 so that when it is switched off the modifications made on the panel of the central computer 82 are deleted and the original parameter functions remain preserved. During performing of the method it is possible to see the whole stored welding program on a screen 85 as well as the selected parameters for the diverse welding beads and any modifications thereto.

In addition, the maximum time values will be programmed in the common computer 82 in order to realize the ring weld 2 distributed over the various stations in the shortest possible time.

Depending on individual problems, it may be necessary to alter the welding parameters for a particular welding lance 48, for which purpose the computer 80 is then operated either from the panel thereof or by remote control. The newly set parameter value will be automatically performed only in the memory of computer 80. As soon as the problem has been overcome, the value set in computer 80 is removed and only the program of the central computer 82 is again followed. The value set in a computer 80 is not entered into central computer 82 in order to avoid transmission to other computers 80.

During performing of the welding work the central computer 82 can provide information about the welding process to an onboard computer arranged, for instance, on the bridge of the pipe-layer so that the captain of the pipe-layer can take this into account in controlling the propulsion or warping of the pipe-layer. It is conceivable for such information to be generated as control signals to an automatic navigation or warping device in order to control the pipe-layer subject to these signals.

Each welding lance 48 is under the control of a welder working practically independently of other welders. He places his welding lance 48 in a start position, automatically or using motors, while making use of switches on the panel of computer 80 or the remote control 81. He selects the welding bead to be carried out and adjusts the position of the welding lance 48, i.e. in peripheral direction in the start position, in lance direction and transverse direction and then switches on the start switch. The welding carriage 21 then begins to run according to the programmed speed. One after the other the oscillation movement starts, the gas feed is opened, the welding voltage is applied and the welding wire feed starts moving. During welding the welder can alter the welding lance position slightly and adjust the oscillation amplitude within a margin of ±0.5 mm relative to the programmed value.

The welding lance position is measured with the angle measuring device 66 and generates angular distance signals to the computer 80 which, subject thereto, supplies the control signals as according to FIG. 5. At the end of the welding sector the welding lance 48 will automatically cease its welding operation, switching off in sequence the welding wire feed, welding voltage, carriage displacement, shield gas feed and oscillation movement.

The welding lance 48 will return to its starting position at maximum speed. Having arrived there, the following welding bead is automatically selected and starting and further operations take place automatically. If necessary, the welder can at any time bring to a halt the welding operation of a welding lance 48.

Data relating the progress of the welding operation of all welding lances 48, i.e., all control values as a function of the angular distance a with their modifications as set by the welder, can be recorded in the central computer 82. The computer 82 receives from an angle measuring device 90 signals relating to the momentary angle of pitch e of the pipe-layer and delivers these continually to the computers 80. The six mentioned parameters are now set subject to the angular distance a which is corrected for the angle of pitch e.

Shown in the diagram of FIG. 5 are communication hardware 99, connected to the computer 80 via control electronics 98, and electronics 100 of the stepping motors.

It is noted that the control of the welding process subject to the angular distance a can also be used with welding devices wherein a ring for clamping round a pipe also comprises the rails and the gear rim for a welding carriage.

The device for measuring the angular distance can be an angle measuring device based on measurement of the angular displacement relative to a permanently vertical pendulum. Preferably the covered angular distance a is measured by measuring and recording the path traversed by the gear rim 26 by measuring and recording the number of revolutions or fractions of revolutions of the stepping motor 28. This is very simple using a computer.

I claim:

1. A method for welding together ends of pipes wherein the pipe ends of a plurality of pipes held mutually in line in a pipe string are welded to each other on a movable pipe-laying device subject to rolling movements, and wherein at a plurality of welding stations, simultaneous welding processes are performed to make welds between the pipe ends, the method comprising providing a signal which is dependent on the inclination of the line of pipe due to rolling movements of said pipe-laying device, and at least at one of said welding stations, controlling a parameter of the welding process automatically in dependence on said inclination signal.

2. A method as claimed in claim 1, comprising controlling a plurality of parameters of said welding process, each weld having a periphery, the welding being performed by a moving welding lance having a peripheral displacement about the periphery of the weld, the method comprising controlling with electric stepping motors the peripheral displacement of at least one welding lance over the periphery of the weld, the feed of welding wire to said welding lance, the radial distance of said welding lance relative to an inner diameter of the weld and a zigzag movement of said welding lance.

3. A method as claimed in claim 1, wherein the pipe-laying device comprises a vessel floating on water.

4. A pipe-layer comprising a vessel adapted to float on water and carrying a device for welding together ends of pipes held mutually in line in a pipe string, said device comprising a plurality of welding devices situated at a plurality of welding stations each performing a welding process, at least one angle measuring means being provided for generating a signal dependent on the inclination of the pipe line due to rolling movements of said pipe-layer, and means receiving the inclination signal for controlling a parameter of the welding process at least at one welding station.

5. The pipe-layer as claimed in claim 4, wherein a plurality of welding parameters are controlled, the weld having a periphery and being made by a moving welding lance, and further comprising at least one stepping motor for driving the peripheral displacement of the welding lance over the periphery of the weld; at least one stepping motor for driving a welding wire feed of the welding lance; at least one stepping motor for driving the radial distance of the welding lance relative to an inner diameter of the weld; and at least one stepping motor for driving a zigzag movement of the welding lance.

6. A device for welding together ends of pipes held mutually in line in a pipe string, said device being adapted to be disposed on a movable pipe-laying platform of welding stations each performing a welding process, at least one angle measuring means being provided for generating a signal dependent on the inclination of the pipe line due to rolling movements of said pipe-laying platform, and further comprising means receiving the inclination signal for controlling a parameter of the welding process at least at one welding station.

7. The device as claimed in claim 6, wherein a plurality of welding parameters are controlled, the weld having a periphery and being made by a moving welding lance, and further comprising at least one stepping motor for driving the peripheral displacement of the welding lance over the periphery of the weld; at least one stepping motor for driving a welding wire feed of the welding lance; at least one stepping motor for driving the radial distance of the welding lance relative to an inner diameter of the weld; and at least one stepping motor for driving a zigzag movement of the welding lance.

8. The device as claimed in claim 6, wherein the pipe-laying platform comprises a vessel floating on water.

* * * * *